United States Patent [19]

Hays et al.

[11] Patent Number: 5,656,997
[45] Date of Patent: Aug. 12, 1997

[54] MAGNETIC RESONANCE ALARM DEVICE

[76] Inventors: Al Hays; Lester Wooten, both of 4093 Oceanside Blvd., Ste. H., Oceanside, Calif. 92056

[21] Appl. No.: 491,371

[22] Filed: Jun. 16, 1995

[51] Int. Cl.$^6$ ................................................ G08B 13/14
[52] U.S. Cl. .......................... 340/566; 340/429; 340/571; 340/665; 340/669
[58] Field of Search ................................. 340/566, 429, 340/571, 669, 665

[56] References Cited

U.S. PATENT DOCUMENTS

| | | | |
|---|---|---|---|
| 4,584,569 | 4/1986 | Lopez et al. | 340/566 |
| 4,772,879 | 9/1988 | Hein | 340/566 |
| 4,901,569 | 2/1990 | Lui | 340/429 |
| 5,459,447 | 10/1995 | Snyder et al. | 340/566 |

*Primary Examiner*—Glen Swann
*Attorney, Agent, or Firm*—Gene Scott; Patent Law & Venture Group

[57] ABSTRACT

A transducer device for converting mechanical motion into an electrical output, consists of an inductance, a flexible support and a permanent magnet positioned in approximately colinear alignment, the nature of the flexible support being such that the inductance and the permanent magnet are free to move mutually independently. The magnetic fields of the permanent magnet and the inductance are mutually interactive, and when the flexible support moves even slightly, it causes the magnet to move, which in turn induces changes in the self-inductance of the inductance and thus the resonance of the circuit, so as to convert the mechanical motion into an electrical output. This inventive transducer device may be implemented in a wide variety of different circuits to serve various functions, but it is particularly suited for use in an alarm device having one or more alarm or warning means.

9 Claims, 2 Drawing Sheets

MAGNETIC RESONANCE ALARM DEVICE

BACKGROUND OF THE INVENTION

1. Field of the Invention

This invention relates generally to perturbation transducers especially of the type for sensing movement, and more particularly to an improved means by which to sense slight mechanical motions, and to provide an electrical signal output. The device is primarily intended for use within an automobile alarm system to trigger an audible alarm when a predetermined level of mechanical motion is detected for a designated period of time.

2. Description of Related Art

Transducers for the sensing of mechanical motion or physical shock are well known in the art. Such transducers include mercury switches, strain gauges, magnetic reed switches, simple pendulous devices and a vast array of other means for producing either a mechanical or electrical signal in response to a physical motion or disturbance. Since the need for alarm related sensors is rapidly growing at this time, there is a strong market for such sensors and the circuits in which they may effectively operate, and a requisite need for reducing the cost of production of such devices.

In the field of automotive alarms, we find a strong demand for more reliable and inexpensive devices to thwart the break-in of parked vehicles. Since all break-in events require some physical motion of the vehicle under attack, it is logical to use a transducer that can sense slight physical motions or jars to the vehicle and respond by setting an alarm system into action. Lopez et al, U.S. Pat. No. 4,584,569 uses such a transducer by establishing a rest relationship between a magnetic field of an inductor and a proximity magnetic field of a permanent magnet. The magnet is held by an elastic band system so as to be approximately motionless when the vehicle is also at rest. However, when the vehicle experiences even a slight motion, caused, for instance by an intruder pressing against the vehicle or even just touching it, vehicle motion causes the magnetic field of the permanent magnet to move with the magnet itself, which, in turn, changes the self-inductance of the inductor and thus the voltage drop across the inductor which may be used by a logic circuit element to set the alarm circuit into action. However, Lopez et al and other sensors of this type are generally too expensive and have less than an optimum sensitivity. For instance, the rubber band support system of Lopez et al is a relatively expensive molded part and suffers the disadvantage of low response sensitivity in inverse proportion to its physical strength, i.e., the stronger and more robust the rubber bands are, the less sensitivity to motion that will be able to be detected. It is desired to provide such a system that has less cost in manufacture and also provides an improvement in sensitivity to motion, so that, for instance, a less expensive magnet may be used.

The present invention fulfills these needs and provides further related advantages as described in the following summary.

SUMMARY OF THE INVENTION

The present invention is an improved transducer device designed to convert mechanical motion into an electrical output. The transducer device consists generally of an inductance and a permanent magnet with a flexible support secured to and positioned between them so that both the inductance and the magnet are free to move mutually independently, constrained only by the flexible support. The flexible support is constructed of a block of resilient material such as foam rubber, so that virtually all vibrations, regardless of their frequency, cause the flexible support to move, which in turn causes the permanent magnet to move. When the transducer device is at rest, the magnetic fields of the permanent magnet and the inductance are mutually interactive resulting in a rest self-inductance. Thus, the motion of the permanent magnet, induced by vehicle motion through the flexible support, induces changes in the self-inductance of the inductance. Thus, it is a primary object of the present invention to provide a transducer device that utilizes an inductance, a permanent magnet and a flexible support to detect vibrations and convert this mechanical motion into an electrical output. Please note that the system is sensitive to motion about any axis in three-space, including translational motion and rotational motion about any axis. The permanent magnet is not constrained to move only in two translational directions and about one rotational axis, as in Lopez et al, supra. Instead, the permanent magnet acts as a pendulous mass so that when the inductance is moved with vehicle motion, the permanent magnet does not move exactly with it, rather lagging behind biased to move with the inductance only by the flexible support. Since this block of foam material can be as rigid or non-rigid as desired, it forms a perfect device for connecting the inductor and the permanent magnet. Another advantage of the direct connection of the inductance and the permanent magnet is that the physical relationship is set and fixed. This is not true in the Lopez et al device where the exact placement of the inductor on the circuit board establishes the physical relationship between the inductor and the magnet. The fixed relationship is superior in that the inductive resonance relationship is also fixed, providing an improvement in circuit accommodation requirements. Thus it is the primary objective of the present invention to provide a transducer that is simple, easily produced in quantity with small variations in response characteristics between units, inexpensive, and sensitive to motion in all directions and about all axis of rotation.

The transducer device may be incorporated into a wide variety of different electrical systems. However, it is most particularly suited for implementation within an alarm system, such as an automobile alarm or a home alarm. In this embodiment, motion is sensed by the transducer. The inductance and a capacitor form a tank circuit, which is resonant at preferably approximately 160 Hz. Motion perturbations cause voltage changes sensed, and amplified to a usable level by an amplification circuit. The gain of the amplification circuit can be adjusted by the user of the alarm device. A low pass filter circuit then attenuates frequencies above approximately 1000 Hz, and an output driver circuit generates an output pulse when there is a signal of sufficient duration and magnitude. The output pulse closes a trigger output line, which in turn may be used to activate an audible alarm or other warning device. Preferably, an output pulse delaying circuit is positioned between the low-pass filter circuit and the output driver circuit so as to provide a brief delay between the detection of motion and the activation of the alarm. Thus, it is an object of the invention to provide an alarm device that utilizes the above described transducer device to its greatest advantage.

In another embodiment, the alarm device includes a single transducer device in connection with two alarm circuits. The alarm circuits are nearly identical in that they contain the same basic components as described above. However, the amplifier circuits of the two alarm circuits are adjusted to boost the signal to different useable levels, thereby making the two alarm circuits responsive to different sensitivities at differing magnitudes of motion of the transducer device. Thus, when a relatively low level of disturbance, or a short term disturbance is generated, the first alarm circuit triggers, causing, for instance an audible warning, such as one or two chirps. When a relatively high level or longer disturbance is sensed, on the other hand, the second circuit triggers, causing, for instance, an audible alarm, such as a siren, to sound. This allows the alarm device to emit a warning prior to sounding off and guards against false alarms. This type of dual response is well-known, and demanded, for use in automobile alarms. However, in the past such alarms often employ a radar device, which is relatively expensive and includes a large number of parts that may potentially require repair or replacement more often then a relatively simple circuit. Thus, it is an object of the present invention to provide a relatively inexpensive and simple alarm device that provides the capability to trigger depending upon varying degrees of disturbance.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a transducer device. In such drawings.

DETAILED DESCRIPTION OF THE PREFERRED EMBODIMENT

Figure 1:
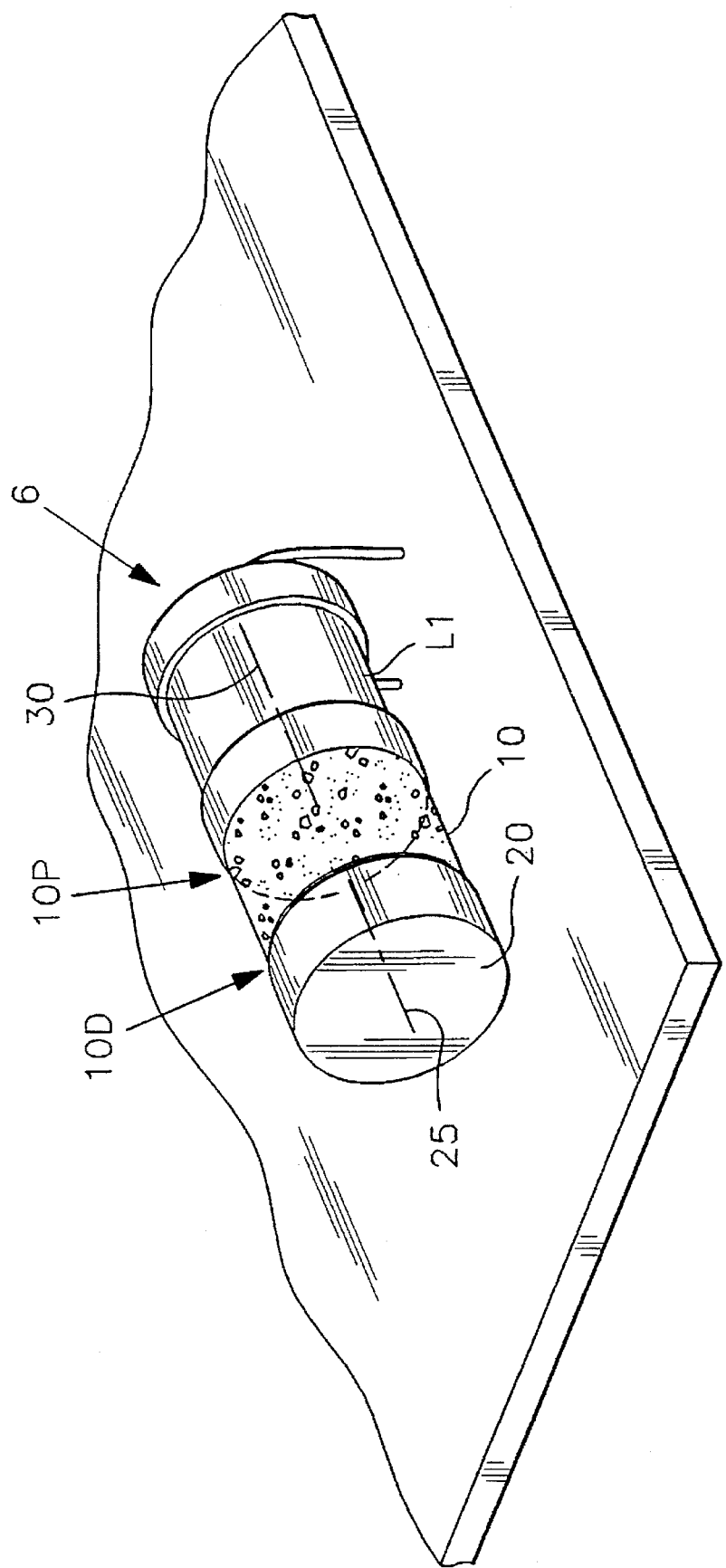
FIG. 1 is a perspective view of the preferred embodiment of the present invention, particularly showing an inductance, flexible support and permanent magnet in approximately colinear alignment.

FIG. 1 shows a transducer device 6 designed to convert mechanical motion into an electrical output. The transducer 6 is comprised of an inductance L1, a flexible support 10 and a permanent magnet 20. A proximal end 10P of the flexible support 10 is fixed to the inductance L1, by an appropriate adhesive or other fixing means, and a distal end 10D of the flexible support is fixed to the permanent magnet 20, by the adhesive or other fixing means, so that, as illustrated in FIG. 1, a core axis 30 of the inductance L1 is roughly colinearly aligned with a north-south axis 25 of the magnet 20. The nature of the flexible support 10 is such that the inductance L1 and the permanent magnet 20 are free to move mutually independently, constrained only by the flexible support 10. In order to achieve and maintain this relationship, the flexible support 10 is preferably constructed of a block of resilient foam rubber-like material. However, it should be noted that there are many other different types of flexible materials that may be successfully utilized within the scope of the present invention. It is important to note that the magnet 20 is maintained in a fixed physical relationship with the inductance L1, when both are in a rest state.

Figure 2:
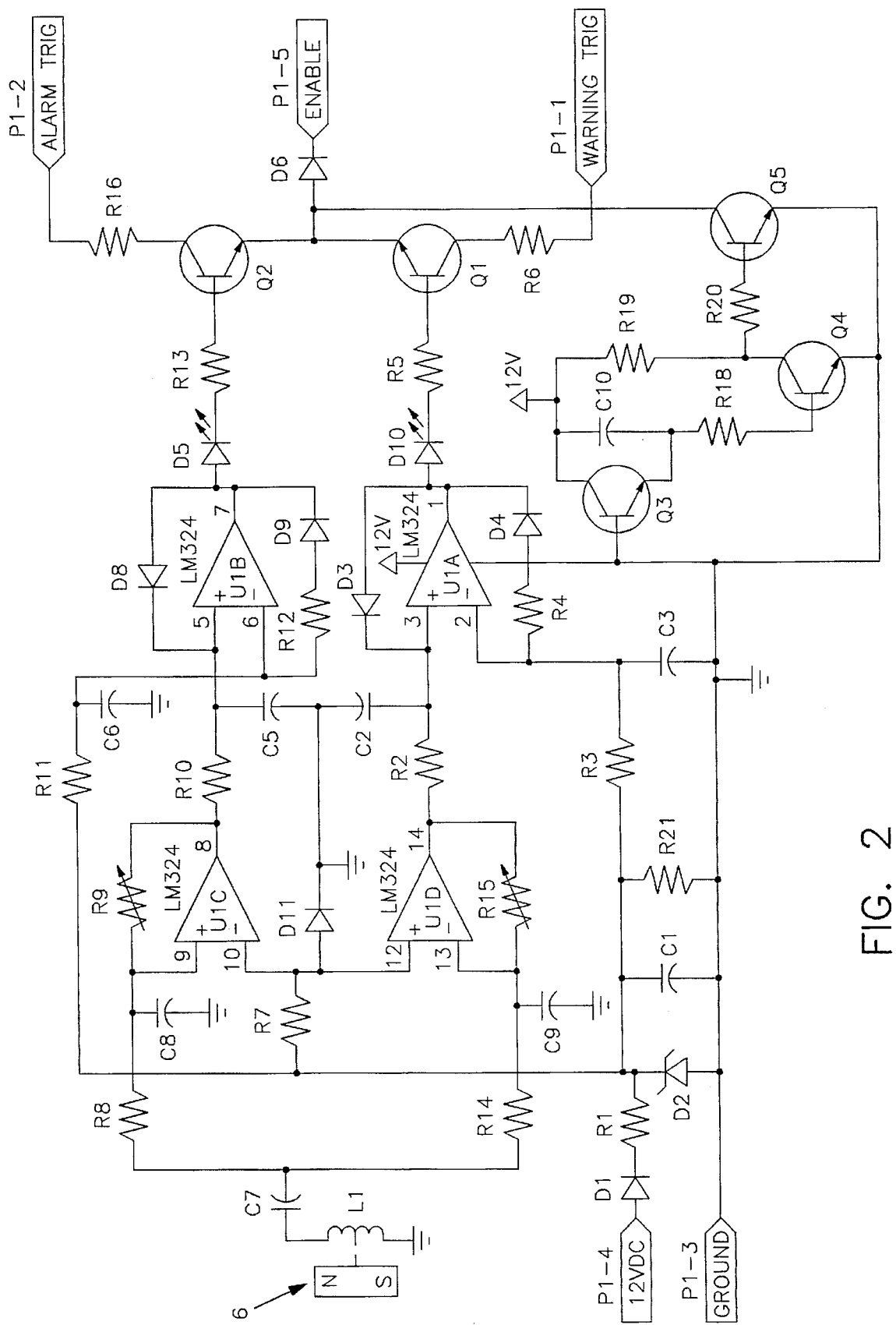
FIG. 2 is an electrical schematic diagram, particularly showing the relationship between the transducer device and a dual trigger circuit.

FIG. 2 provides a schematic representation of the present invention. When the components of the transducer device 6 are aligned in the above described manner, the magnetic fields of the permanent magnet 20 and the inductance L1 are mutually interactive producing, at rest, a rest self inductance of the inductance L1. Any movement or vibration of the transducer device 6 generally causes the flexible support 10 to flex, and even a slight flexing induces the permanent magnet 20 to move away from its rest relationship with inductance L1. In turn, the movement of the permanent magnet 20 induces changes in the self-inductance of the inductance L1. Please note that L1 is coupled to C7 forming a tank circuit having resonance which is disturbed when the inductance value of L1 changes due to relative motion between L1 and the magnet. The transducer device 6 thus converts mechanical motion into an electrical output, i.e., change in voltage level at pins 9 and 12 of U1. This inventive transducer device 6 may be implemented in a wide variety of different circuits to serve various functions.

However, such a transducer device 6 is particularly suited for use in an alarm device. In one preferred embodiment, illustrated schematically in FIG. 2, the transducer 6 is incorporated into an alarm device with a first and a second electrical alarm or trigger circuits, i.e. alarm trigger, and warning trigger. The use of two alarm circuits in conjunction with a single transducer device 6 allows the alarm device to emit different audible sounds depending on the magnitude and/or duration of the motion sensed by the transducer device 6. Preferably, the two alarm circuits are adjusted for differing sensitivities so that when a small disturbance is sensed, the first circuit triggers a warning to be emitted, and when a relatively higher disturbance is sensed, the second circuit triggers an alarm to sound-off.

As illustrated in FIG. 2, the two electrical circuits are nearly identical to one another, and both the warning and the alarm circuits have both common circuit elements such as a tank circuit capacitance C7 and a power supply circuit, and duplicate circuit elements, such as a voltage amplifier circuit, a low-pass filter circuit, and an output driver circuit.

The following is a brief description of each of the components that comprise the various elements of the two circuits.

| Elements Common to Both Circuits: | |
| --- | --- |
| L1, C7 | Sensor tank circuit |
| R7, D11 | Minimum trigger threshold for amplifiers |
| D6 | Protection diode for enable line |
| D1, R1, D2, C1 | Power supply |

| First Alarm Circuit: | |
| --- | --- |
| R8, R9, U1C | Amplifier; gain of 195 |
| R10, C5 | 1000 Hz low pass filter |
| R11, C6, R12, D9, D8, U1B | Output pulse delay circuit |
| D5 | Indicator light |
| R13, R16, Q2 | Output driver circuit |

| Second Warning Circuit: | |
| --- | --- |
| R14, R15, U1D | Amplifier, gain of 1400 |
| R2, C2 | 1000 Hz low pass filter |
| R3, C3, R4, D4, D3, U1A | Output pulse delay circuit |
| D10 | Indicator light |
| R5, R6, Q1 | Output driver circuit |

The circuit elements are interconnected such that the inductance L1 and the tank circuit capacitance C7 form the tank circuit. The tank circuit provides an electrical signal that varies in magnitude in accordance with movement of the permanent magnet caused by vibration. The tank circuit is preferably resonant at approximately 160 Hz.

The signal is then amplified to a usable level by the voltage amplifier circuits. The first alarm circuit preferably amplifies the signal with a gain of approximately 195, while the second warning circuit preferably amplifies the signal with a gain of approximately 1400. Because the warning circuit amplifies the signal to a much higher level than does the alarm circuit, disturbances with a relatively low magnitude cause the warning circuit to trigger the audible warning output line, whereas only relatively heavy shocks will cause the alarm circuit to trigger the audible alarm output line. The alarm circuit preferably consists of integrated circuit portion U1C, resistance R8 and resistance R9, and the warning circuit preferably consists of resistance R14, resistance R15 and integrated circuit portion U1D. Resistance R7 and diode D11 preferably provide a minimum input trigger threshold of 0.7 V for both the amplifier circuits. As illustrated, both resistance R9 and R15 are preferably adjustable, thus allowing a user to individually adjust the sensitivity of each circuit.

Next, the signals are respectively smoothed by the low-pass filter circuits so that higher frequencies, such as those caused by passing vehicles, circuit noise, thunder or the like, do not cause either the warning or the alarm to be triggered. Preferably, the low-pass filter circuits for both of the alarm circuits attenuate frequencies above 1000 Hz. The low-pass filter circuit oft he alarm circuit preferably consists of resistance R10 and capacitance C5, and the low-pass filter circuit of the warring circuit preferably consists of resistance R2 and capacitance C2.

When there is a signal of sufficient duration and magnitude in the warning circuit at pin 3 of U1A, the output driver circuit generates a 100 ms pulse at pin 1 for switching on the warning trigger output line, which in turn causes a warning to be actuated, such as a chirping device. Likewise, when there is a signal of sufficient duration and magnitude in the alarm circuit at pin 5 of U1B, an output driver circuit generates a 100 ms output pulse at pin 7 for switching on the alarm trigger output line, which in turn causes an output device such as an audible alarm to sound. Preferably, the alarm device is configured so that when the alarm is triggered, it overrides the warning. The output driver circuit is preferably comprised of resistance R13, resistance R16 and transistor Q2, and the warning output driver circuit is comprised of resistance R5, resistance R6 and transistor Q1.

Preferably, an output pulse delay circuit is positioned in both the warning and the alarm circuits between the low-pass filter circuit and the output driver circuit so as to cause a delay between the time the vibration is sensed and the time the warning or alarm is triggered. Preferably, the delay for the warning circuit is approximately 100 ms, while the delay for the alarm circuit is approximately 2 seconds, although the delay time may vary in accordance with the intended use of the alarm device. Preferably, the output pulse delay circuit of the alarm circuit consists of resistance R11, capacitance C6, resistance R12, diode DS, diode D9 and integrated circuit UIB, while the output pulse delay circuit of the warning circuit consists of resistance R3, capacitance C3, resistance R4, diode D4, diode D3 and integrated circuit UIA.

As illustrated, each circuit also preferably includes an LED or other such light emitting device for indicating when the trigger of the respective circuit has produced an output. In FIG. 2, D5 is the LED in the alarm circuit, and D10 is the LED in the warning circuit. Additionally, a protection diode D6 is preferably included in an output line, thus preventing signals from warning and alarm circuits which may be coupled to the present circuit from effecting operation of the present circuit.

The power supply circuit common to both the warning and the alarm circuit preferably consists of diode D1, diode D2, resistance R1 and capacitance C1, and receives 12 V from an auto battery or other source. The alarm device preferably includes a time delay circuit configured and interconnected with the device so as to delay start-up power by a selected time delay period when power is applied to the device. This effectively prevents the alarm from sounding due to power surges or other such voltage transients within the device upon activating the power. A single time delay circuit effectively delays the start-up power of both the alarm and the warning circuits. Preferably, the time delay circuit consists of transistors Q3-5, capacitance C10, and resistances R18-20.

In another preferred embodiment of the present invention, the alarm device may consist of, or only use the first alarm circuit. In this embodiment, the components of the alarm device are essentially the same as those described above, the difference being that when only a single alarm circuit is employed, the alarm device is incapable of emitting a warning signal when relatively low level disturbances occur.

Performance: Independent testing results show that the presently claimed transducer has equal or slightly superior sensitivity to the Lopez et al described sensor in a first lateral axis of relative motion, and is 25% to 30% more sensitive in the orthogonal lateral axis of relative motion and in the axis wherein the elements move toward and away from each other. When compared with a piezo shock sensor, the current transducer is superior in that no dead zones exist.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An alarm device comprising:
   a motion sensor including an inductance, a flexible support and a permanent magnet, the flexible support comprising a block of resilient material, a proximal and a distal end of the flexible support being fixed to the inductance, and to the permanent magnet respectively such that the inductance and the permanent magnet are free to move mutually independently, constrained only by the flexible support, magnetic fields of the permanent magnet and the inductance being mutually interactive such that motion of the permanent magnet relative to the inductance through the flexible support induces changes in the self inductance of the inductance.

2. The device of claim 1 wherein the resilient material is foam rubber-like material.

3. The device of claim 1 wherein a core axis of the inductance is approximately colinearly aligned with a north-south axis of the permanent magnet when both the inductance and the permanent magnet are at rest.

4. An alarm device comprising:
   a motion sensor including an inductance, a flexible support and a permanent magnet, the flexible support comprising a block of resilient material a proximal and a distal end of the flexible support being fixed to the inductance, and to the permanent magnet respectively such that the inductance and the permanent magnet are free to move mutually independently, constrained only by the flexible support, magnetic fields of the permanent magnet and the inductance being mutually interactive such that motion of the permanent magnet relative to the inductance through the flexible support induces changes in the self inductance of the inductance;

an electrical alarm circuit incorporating the motion sensor, and further providing a set of circuit elements including a tank circuit capacitance, a voltage amplifier circuit, a low-pass filter circuit, an output driver circuit, and a power supply circuit, the circuit elements interconnected such that the motion sensor inductance and the tank circuit capacitance form a tank circuit providing an electrical signal varying in magnitude with movement of the motion sensor, said signal boosted by the voltage amplifier circuit, and smoothed by the low-pass filter circuit, and thence directed to the output driver circuit for switching on a trigger output line.

5. The device of claim 4 further including an output pulse delaying circuit between the low-pass filter circuit and the output driver circuit so as to delay the signal.

6. The device of claim 4 further including a time delay circuit configured and interconnected with the device to delay start-up power by a selected time delay period when power is applied to the device.

7. The device of claim 4 further including a second electrical alarm circuit approximately identical to the first electrical alarm circuit, the alarm circuits adjusted for differing sensitivities for alarming at differing magnitudes of motion of the inductance.

8. The device of claim 4 wherein the resilient material is foam rubber-like material.

9. The device of claim 4 wherein a core axis of the inductance is approximately colinearly aligned with a north-south axis of the permanent magnet when both the inductance and the permanent magnet are at rest.

* * * * *